United States Patent [19]
Chung et al.

[11] Patent Number: 5,173,208
[45] Date of Patent: Dec. 22, 1992

[54] LIQUID SUSPENSION OF POLYETHYLENE OXIDE FOR USE IN TREATING PAPER AND PULP WASTEWATER

[75] Inventors: Daniel K. Chung, Burlington; Stephen B. Warrick, Ancaster, both of Canada

[73] Assignee: Nalco Canada Inc., Burlington, Canada

[21] Appl. No.: 716,075

[22] Filed: Jun. 17, 1991

[51] Int. Cl.$^5$ .................. C09K 3/00; C07F 5/10; B01D 21/01
[52] U.S. Cl. .................. 252/180; 252/60; 252/61; 252/174.23; 252/82; 210/728; 210/732; 162/168.1
[58] Field of Search .......... 252/60, 61, 180, 174.21, 252/82, 174.23; 210/728, 732; 162/168.1

[56] References Cited

U.S. PATENT DOCUMENTS

| | | | |
|---|---|---|---|
| 3,843,589 | 10/1974 | Wartman | 524/280 |
| 3,974,116 | 8/1976 | Lissant | 210/732 |
| 3,977,971 | 8/1976 | Quinn et al. | 210/738 |
| 3,990,986 | 11/1976 | Gabel et al. | 252/181 |
| 4,303,532 | 12/1981 | Smelley et al. | 210/732 |
| 4,789,466 | 12/1988 | von Rybinski et al. | 252/61 |
| 4,931,190 | 6/1990 | Laros | 210/728 |

FOREIGN PATENT DOCUMENTS 1004782 2/1977 Canada.
454507 5/1988 Sweden.

OTHER PUBLICATIONS

CA 91(16):128470Z, Lindstroem, Tom 1979.
CA 69(6):21235v, Mukai et al. 1968.
CA 68(16):71378u, Yakubovich et al. 1967.

*Primary Examiner*—Prince Willis, Jr.
*Assistant Examiner*—James Silbermann
*Attorney, Agent, or Firm*—Ailes, Ohlandt & Greeley

[57] ABSTRACT

A flocculating agent which comprises: a particulate ethylene oxide polymer present in an amount of between about 20 to about 35% by weight; an inert liquid vehicle comprising a mixture of a glycol which is present in an amount between about 25 to about 30% by weight, and glycerine which is present in an amount between about 45 to about 50% by weight, wherein the specific gravity of the ethylene oxide polymer is approximately the same as the specific gravity of the inert liquid vehicle; and a suspension agent which is present in an amount between about 0.4 to about 0.6% by weight, wherein the flocculating agent has a viscosity in the range between about 1800 to about 5900 cps.

6 Claims, No Drawings ns of cellulose fibre suspensions,
LIQUID SUSPENSION OF POLYETHYLENE OXIDE FOR USE IN TREATING PAPER AND PULP WASTEWATER The present invention is directed to a unique flocculating agent and a process capable of improving the retention and purification of cellulose fibre suspensions, and clarification of wastewater generated from the paper, pulp and board industries.

BACKGROUND OF THE INVENTION

Prior to delivery of paper and pulp wastewater to a dissolved air flotation (DAF) unit the wastewater is pre-treated with chemical additives which aid in the retention and separation of cellulose fibre suspension, fillers and other dispersed particles from the water.

In the dissolved air flotation process, clarification is achieved by forming micron-sized air bubbles in the water-fibre suspension which attach themselves to the suspended fibre or ash and float to the surface where they can be skimmed off with a mechanical scoop. The air bubbles are formed by dissolving air under 60-90 psi pressure. When released to the atmosphere in the DAF unit, the gas comes out of solution producing bubbles which average 20 microns in size.

Another advantage of dissolved air is that the lifting action of the bubbles tends to concentrate solids at the surface often making it possible to recover solids at concentrations of 2-4%. DAF units are typically designed such that the aerated mixture is laid in the unit at essentially zero velocity. In circular units this is accomplished by matching the speed of rotation of the inlet manifold to the flow. This minimizes turbulence and cross flow allowing the unit to take full advantage of the coagulation, flocculation, and the lifting action of the bubbles.

Despite the inherent efficiency of DAF units and recent improvements and innovations in design, in most cases it is desirable and cost effective to enhance their performance by using synthetic coagulants and flocculants. Such polymer additives can increase throughput and aid in the removal of fillers such as clay, titanium, and calcium carbonate which are often in a highly dispersed state due to the charge balance of the influent.

Canadian Patent No. 1,004,782 discloses the use of a phenol formaldehyde resin in combination with a high molecular weight polyethylene oxide to improve the retention at the dewatering of cellulose fibre suspensions. It was determined therein that the polyethylene oxide facilitates agglomeration of the flocculations formed with the phenol formaldehyde resin whereby retention and clarification are facilitated.

Swedish Patent Publication No. 454,507 (assigned to Berol Kemi Ab) discloses that the retention and/or purification of cellulose fibre suspensions and clarification of wastewater within the paper, pulp or board industry may be improved through pre-treatment with phenol formaldehyde resin and high molecular weight polyethylene oxide in combination with a cationic starch derivative or a cationic cellulose derivative.

Both of the aforementioned conventional pre-treatment methods utilize a dry particulate polyethylene oxide flocculant to facilitate retention and clarification. That is, these conventional methods call for the addition of polyethylene oxide to wastewater by diluting dry particular polyethylene oxide with water to approximately 0.2% by weight immediately before addition.

The present inventors have developed a novel liquid suspension of polyethylene oxide which exhibits a much lower viscosity even at a higher concentration (based on percent active), i.e., a product which is more pumpable and which goes into solution much faster than dry polyethylene oxide. Experiments have shown that the novel liquid suspension of polyethylene oxide demonstrated a replacement ratio of 2:1 when compared to dry polyethylene oxide. It is believed that possible explanations for the markedly improved viscosity and flow rates of liquid suspension of polyethylene oxide verses dry polyethylene oxide are: (1) more effective solubilization of the liquid suspension due to the presence of a wetting agent, and (2) shear sensitivity of the polyethylene oxide (i.e., shear degradation). That is, liquid suspension of polyethylene oxide facilitates solution of the polyethylene oxide particles at a faster rate and higher level of activity than the conventional dry feeder approach.

Although it has not been applied to the treatment of pulp, paper and board industry wastewater, U.S. Pat. No. 3,843,589 (Wartman), which issued on Oct. 22, 1974, does disclose the forming of a pumpable slurry of polyethylene oxide. According to the Wartman patent, a stable slurry formulation may be formed by mixing particulate polyethylene oxide, an inert liquid vehicle of a glycol and glycerine, and a thickening agent, e.g., colloidal silica. This patent was particularly concerned with the pumping of polyethylene oxide slurries against a head pressure using some type of positive displacement pump, e.g., gear pumps, moyno pumps, and diaphragm pumps. These pumping configurations can result in a phenomenon called "synaeresis", i.e., liquid carrier medium flows back through the clearance while the particles are not free to do so, thus resulting in the forward chamber of the pump becoming filled with semi-dry polymer due to the backflow of the liquid carrier medium. This liquid suspension exhibits high resistance to stratification and molecular weight degradation of the active polymer.

The primary difference between the liquid suspension of polyethylene oxide according to the present invention and that disclosed in the Wartman patent is that the present invention produces a flocculating agent which is suitable for use as a pre-treating aid in paper and pulp wastewater. Moreover, the present invention utilizes a suspension agent to assist in maintaining the polyethylene oxide in suspension within the inert liquid vehicle. It also results in a liquid suspension which has a much lower viscosity than that of Wartman, and which is better suited for use as a flocculant in the pre-treatment of paper and pulp wastewater.

One reason for the drastic difference in viscosity is that the Wartman patent discloses the use of a thickening agent, such as colloidal silica, which does not reduce viscosity as the solids loading is increased. To the contrary, the suspension agent used in the flocculating agent of the present invention provides for a dramatic reduction in viscosity, increased stability and an increased solids loading.

The present invention also provides many additional advantages which shall become apparent as described below.

SUMMARY OF THE INVENTION

A flocculating agent which comprises: a particulate ethylene oxide polymer present in an amount of between about 20 to about 35% by weight; an inert liquid vehicle comprising a mixture of a glycol which is present in an amount between about 25 to about 30% by weight, and glycerine which is present in an amount between about 45 to about 50% by weight, wherein the specific gravity of the ethylene oxide polymer is approximately the same as the specific gravity of the inert liquid vehicle; and a suspension agent which is present in an amount between about 0.4 to about 0.6% by weight.

The glycol is preferably propylene glycol. The suspension agent comprises a mixture of a polymeric fatty acid ester and a dispersing agent. Moreover, the flocculating agent has a Brookfield viscosity in the range between about 1800 to about 5900 centipoise (cps).

The specific gravity of the ethylene oxide polymer is in the range between about 1.13 to about 1.22, and the specific gravity of the inert liquid vehicle is in the range between about 1.11 to about 1.23.

An additional object of the present invention is a method of treating paper, pulp or board wastewater to improve retention and purification of cellulose fibre suspensions and clarification of the wastewater. The method comprises the addition thereto of a flocculating agent which comprises a particulate ethylene oxide polymer present in an amount of between about 20 to about 35% by weight, an inert liquid vehicle comprising a mixture of a glycol which is present in an amount between about 25 to about 30% by weight, and glycerine which is present in an amount between about 45 to about 50% by weight, wherein the specific gravity of the ethylene oxide polymer is approximately the same as the specific gravity of the inert liquid vehicle, and a suspension agent which is present in an amount between about 0.4 to about 0.6% by weight.

The flocculating agent according to this method is used in a concentration in the range between about 0.2 to about 0.5%, more preferably in the range between about 0.4 to about 0.5%.

Other and further objects, advantages and features of the present invention will be understood by reference to the following examples.

DESCRIPTION OF THE PREFERRED EMBODIMENTS

Paper, pulp and board wastewater is pre-treated with a liquid suspension of polyethylene oxide (i.e., flocculating agent) to improve retention and/or purification of cellulose fibre suspensions, and clarification of the wastewater. The wastewater is typically pre-treated prior to clarification within a dissolved air flotation (DAF) unit where the recovered solids and colloidal material are floated to the surface of the DAF unit and skimmed off by a mechanical scoop. The resultant clarified water is thereafter sent on for further processing.

Optionally, this flocculating agent is used together with a settling clarifier for primary clarification of effluents from a pulp or paper production process.

The flocculating agent comprises: a particulate ethylene oxide polymer present in an amount of between about 20 to about 35% by weight; an inert liquid vehicle comprising a mixture of a glycol which is present in an amount between about 25 to about 30% by weight, and glycerine which is present in an amount between about 45 to about 50% by weight; and a suspension agent which is present in an amount between about 0.4 to about 0.6% by weight.

The ethylene oxide polymer is preferably polyethylene oxide having a molecular weight in the range between about 100,000 to about 20,000,000, preferably about 5,000,000 to about 20,000,000, more preferably about 8,000,000 to about 12,000,000.

The glycol is preferably propylene glycol. Although it is also possible that the glycol could also be 1,3-butylene glycol, 1,6-hexylene glycol, ethylene glycol, and dipropylene glycol. It is also possible that the glycol could be replaced with butyl carbitol.

It may also be possible to substitute any of the following compositions for glycerine 1,2,3,4,5,6 hexane hexol, 1,2,3,4 butane tetrol, pentaerythritol and ethylene carbonate.

The suspension agent comprises a mixture of a polymeric fatty acid ester and another dispersing agent. An example of a preferred polymeric fatty acid ester is a 40% polymeric fatty acid ester, e.g., Atkemix Hypermer LP6 sold by ICI. The Atkemix Hypermer LP6 fatty acid ester is preferably combined with another dispersing agent such as Atkemix Hypermer PS2 sold by ICI. Other potential dispersing agents are stearic monoethanolamide, N,N'-ethylene bis stearamide, polyacrylic acid, polyacrylate, and aluminum stearate. The suspension agent provides improved wetting, dispersion, stabilization and fluidization which can give rise to a variety of effects which may be used to advantage in many particulate suspensions. The effects of the suspension agent on the liquid suspension of polyethylene oxide is a dramatic viscosity reduction, increased stability and increased solids loading, i.e., can attain higher percent by weight polyethylene oxide than conventional polyethylene suspensions.

The flocculating agent has a Brookfield viscosity in the range between about 1800 to about 5900, and more preferably 1800 to about 3200 cps. The specific gravity of the ethylene oxide polymer is approximately the same as the specific gravity of the inert liquid vehicle. Specific gravity of the ethylene oxide polymer is in the range between about 1.13 to about 1.22, and the specific gravity of the inert liquid vehicle is in the range between about 1.11 to about 1.23.

The preferred flocculating agent is prepared by initially charging a reactor vessel with 27.6% by weight of a propylene glycol and 47% by weight of a 95% solution of glycerine with agitation. Cool the mixture to approximately 15°–25° C., more preferably between about 18°–22° C. The use of temperatures above 25° C. can result in products which are more viscous than desirable. During mixing, accurately charge the reactor vessel with a suspension agent comprising 0.2% by weight of a 40% polymeric fatty acid ester and 0.2% by weight of a dispersing agent. Continue to mix rapidly and slowly charge the reactor vessel with 25% by weight of a dry particulate polyethylene oxide. If added too rapidly, the polyethylene oxide tends to form lumps in the batch which are difficult to break up with mixing. After all of the polyethylene oxide is charged into the vessel, mix for an additional hour.

The flocculating agent prepared above is used in treating paper, pulp or board wastewater to improve retention and purification of cellulose fibre suspensions, and clarification of the wastewater. The flocculating agent is preferably added to the wastewater in a concentration within the range between about 0.2 to about 0.5%, more preferably in the range between about 0.4 to about 0.5%. This is accomplished by adding the flocculating agent to water in a mixing vessel having a blade type of agitator which is capable of operating at between 350–400 rpm.

The following comparative examples where conducted to demonstrate the advantages of the liquid suspension of polyethylene oxide according verses the conventional dry polyethylene oxide preparations and to determine the best formulation of the product.

EXAMPLES 1-4

Four samples were prepared and tested for viscosity and flow rate. Sample 1 is a 0.1% solution of polyethylene oxide prepared from dry particulate polyethylene oxide. Sample 2 is a 0.2% solution of polyethylene oxide prepared from dry particulate polyethylene oxide. Sample 3 is a 0.4% solution of polyethylene oxide prepared from a liquid suspension of polyethylene oxide (i.e., flocculating agent) comprising 27.6% by weight of propylene glycol, 47% by weight of a 95% solution of glycerine, 0.2% by weight of a 40% solution of a polymeric fatty acid ester, 0.2% by weight of a dispersing agent, and 35% by weight of a dry particulate polyethylene oxide. Sample 4 is an 0.8% solution of polyethylene oxide prepared from the liquid suspension of polyethylene oxide describe in sample 3 above.

The results are set forth in Tables 1 and 2 below.

TABLE 1

| SAMPLE | [Viscosity Profile @ 350 rpm] | | | | | | | | |
| --- | --- | --- | --- | --- | --- | --- | --- | --- | --- |
| | 30 sec | 60 sec | 120 sec | 5 min | 10 min | 15 min | 20 min | 25 min | 30 min |
| 1 | 4.9 | 11.9 | 8.5 | 8.0 | 8.5 | 8.1 | 8.5 | 8.4 | 8.3 |
| 2 | 5.2 | 6.1 | 6.9 | 7.0 | 8.0 | 8.4 | 8.5 | 8.6 | 9.0 |
| 3 | 66.5 | 78.4 | 23.5 | 13.5 | 12.0 | 12.1 | 12.0 | 12.0 | 12.0 |
| 4 | 88.0 | 192 | 46.9 | 44.1 | 40.1 | 39.6 | 39.5 | 39.5 | 39.4 |

TABLE 2

| SAMPLE | [Flow Rate: Time for 20 mL to flow through a pipette] | | | | | | | | |
| --- | --- | --- | --- | --- | --- | --- | --- | --- | --- |
| | 30 sec | 60 sec | 120 sec | 5 min | 10 min | 15 min | 20 min | 25 min | 30 min |
| 1 | 30.4 | 40.3 | 40.8 | 36.9 | 35.6 | 31.5 | 31.1 | 30.8 | 30.6 |
| 2 | 32.7 | 33.7 | 33.5 | 32.3 | 32.2 | 32.9 | 33.2 | 31.3 | 31.7 |
| 3 | 173.4 | 148.1 | 84.2 | 50.4 | 46.0 | 45.9 | 46.4 | 45.4 | 44.7 |
| 4 | 408.0 | 305.7 | 247.0 | 156.0 | 111.1 | 89.7 | 79.2 | 71.9 | 62.8 |

A lot of insoluble polymer was discovered in beakers of samples 1 and 2 after 30 minutes. Also, it was determined that the liquid suspension of polyethylene oxide in samples 3 and 4 dissolved much faster than the dry polyethylene oxide used in samples 1 and 2. The viscosity of sample 3 was substantially lower than either of samples 1 or 2, based on concentration.

EXAMPLES 5-13

The following samples were prepared in accordance with the above-mentioned liquid suspension polyethylene oxide make-up procedure. Samples 5, 6, 7, 9, and 13 remained stable after three days at 60° C., while samples 8, 10, 11, and 12 exhibited a slight separation.

TABLE 3

| Sample | Glycerine | Isoparaffinic Solvent | Heavy Aromatic Naptha | Carbopol 934 (polyacrylate) | PEO |
| --- | --- | --- | --- | --- | --- |
| 5 | 70 | 5 | — | 1 | 15 |
| 6 | 70 | 10 | — | 1 | 15 |
| 7 | 70 | — | 5 | 1.8 | 15 |
| 8 | 70 | 5 | — | 0.5 | 15 |
| 9 | 70 | 5 | — | 0.8 | 15 |
| 10 | 75 | — | — | 0.8 | 15 |
| 11 | 80 | — | — | 0.8 | 20 |
| 12 | 75 | — | — | 0.8 | 25 |
| 13 | 70 | 5 | — | 0.5 | 25 |

None of the aforementioned compositions produced a flocculating agent having the retention and clarification characteristics of the polyethylene oxide prepared in accordance with sample 3 above.

EXAMPLE 14

In order to improve the stability of the liquid suspension of polyethylene oxide made in accordance with the aforementioned method, a 1 liter sample was prepared from:

| | |
| --- | --- |
| 27.5% (275 grams) | of propylene glycol |
| 47.0% (470 grams) | of 45% glycerine |
| 25.0% (250 grams) | of a dry polyethylene oxide |
| 0.5% (5 grams) | of a 40% polymeric fatty acid ester suspension agent |

Stability of the suspension was improved by the matching of the specific gravity of the polyethylene oxide and the combination of propylene glycol/glycerine.

EXAMPLES 15-28

The following examples were an attempt to determine the proper amount of suspension agent which can be added to the liquid suspension of polyethylene oxide without making the suspension unstable.

The liquid suspension set forth in Table 4 below contained 20% by weight of dry polyethylene oxide, 29.5% by weight of propylene oxide, 50.5% by weight of 45% glycerine, and varying amounts of a suspension agent, i.e., 40% polymeric fatty acid ester.

TABLE 4

| Sample | % PEO | % Suspension Agent | Viscosity |
| --- | --- | --- | --- |
| 15 | 20 | 0 | 1300 |
| 16 | 20 | 0.1 | 2550 |
| 17 | 20 | 0.2 | 2850 |
| 18 | 20 | 0.3 | 3100 |
| 19 | 20 | 0.5 | 3050 |

The suspensions listed in Table 5 below included 25% by weight of polyethylene oxide, 27.5% by weight of propylene glycol, 47.5% of 45% glycerine, and varying amounts of suspension agent, i.e., a 40% polymeric fatty acid ester.

TABLE 5

| Sample | % PEO | % Suspension Agent | Viscosity |
|--------|-------|---------------------|-----------|
| 20 | 25 | 0 | 4400 |
| 21 | 25 | 0.1 | 5500 |
| 22 | 25 | 0.2 | 4500 |
| 23 | 25 | 0.3 | 4900 |
| 24 | 25 | 0.5 | 4900 |
| 25 | 25 | 0.6 | 4500 |
| 26 | 25 | 0.7 | 3500 |
| 27 | 25 | 0.8 | 3500 |
| 28 | 25 | 0.9 | 3500 |

Samples 15–18, 20–23 and 27–28 were not stable. Samples 25 and 26 exhibited slight separation. And samples 19 and 24, both of which included 0.5% by weight of a suspension agent of 40% polymer fatty acid ester, appeared stable. As such, samples 19 and 24 were considered satisfactory liquid suspensions of polyethylene oxide. It was later discovered that by combining the polymeric fatty acid ester with another polymeric dispersants such as Atkemix Hypermer PS2 that stable flocculating agents can be prepared from a suspension agent present in the range from about 0.4 to about 0.6% by weight.

EXAMPLES 29–33

The samples set forth below in Table 6 appear to demonstrate that liquid suspensions of polyethylene oxide can be prepared with dry polyethylene oxide in amounts of 30% or more, although such flocculating agents are not as stable as those prepared with lesser amounts of PEO.

TABLE 6

| Sample | % PEO | % Propylene Glycol | % Glycerine | % Suspension Agent | Viscosity |
|--------|-------|---------------------|-------------|---------------------|-----------|
| 29 | 30 | 26 | 44 | 0.5 | 7500 |
| 30 | 30 | 26 | 44 | 0.6 | 7500 |
| 31 | 30 | 26 | 44 | 0.7 | 7500 |
| 32 | 30 | 26 | 44 | 0.8 | 8000 |
| 33 | 30 | 26 | 44 | 1.0 | 8000 |

EXAMPLE 34

A flocculating agent was prepared which comprised 27.6% by weight of propylene glycol, 47% by weight of glycerine, 25% by weight of dry polyethylene oxide, 0.2% by weight of a polymeric fatty acid ester (Hypermer LP6), and 0.2% by weight of another dispersing agent (Hypermer PS2). This flocculating agent demonstrated a viscosity at 125° C. of 1800 cps with a specific gravity of 1.153 and 2200 cps with a specific gravity of 1.147.

It was determined after review of all of the aforementioned data that the best formula for producing a stable liquid suspension of polyethylene oxide includes an inert liquid vehicle comprising propylene glycol and glycerine, dry polyethylene oxide, and a suspension agent which comprises a polymeric fatty acid ester and another dispersing agent; wherein the specific gravity of the dry polyethylene oxide matches the combined specific gravity of the propylene glycol and the dispersing agent. This flocculating agent has a viscosity in the range between about 1800 to about 5900 cps, more preferably in the range between about 1800 to about 3200 cps.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A flocculating agent which comprises:

a particulate polyethylene oxide having a molecular weight in the range between about 100,000 to about 20,000,000, said polyethylene oxide being present in an amount of between about 20 to about 35% by weight;

an inert liquid vehicle comprising a mixture of a glycol which is present in an amount between 25 to about 30% by weight, and glycerine which is present in an amount between about 45 to about 50% by weight, wherein the specific gravity of said polyethylene oxide is approximately the same as the specific gravity of said inert liquid vehicle; and a suspension agent comprising a mixture of a polymeric fatty acid ester and a second dispersing agent selected from the group consisting of stearic monoethyanolamide, N,N'-ethylene bis stearamide, polyacrylic acid, polyacrylate and aluminum stearate, said suspension agent being present in an amount between about 0.4 to about 0.6% by weight, wherein said flocculating agent has a viscosity in the range between about 1800 to about 5900 cps.

2. The flocculating agent according to claim 1 wherein the viscosity is in the range between about 1800 to about 3200 cps.

3. The flocculating agent according to claim 1 wherein said glycol is propylene glycol.

4. The flocculating agent according to claim 1 wherein the molecular weight of said polyethylene oxide is in the range between about 5,000,000 to about 20,000,000.

5. The flocculating agent according to claim 1 wherein the specific gravity of said polyethylene oxide is in the range between about 1.13 to about 1.22.

6. The flocculating agent according to claim 1 wherein the specific gravity of said inert liquid vehicle is in the range between about 1.11 to about 1.23.

* * * * *